Patented June 21, 1927.

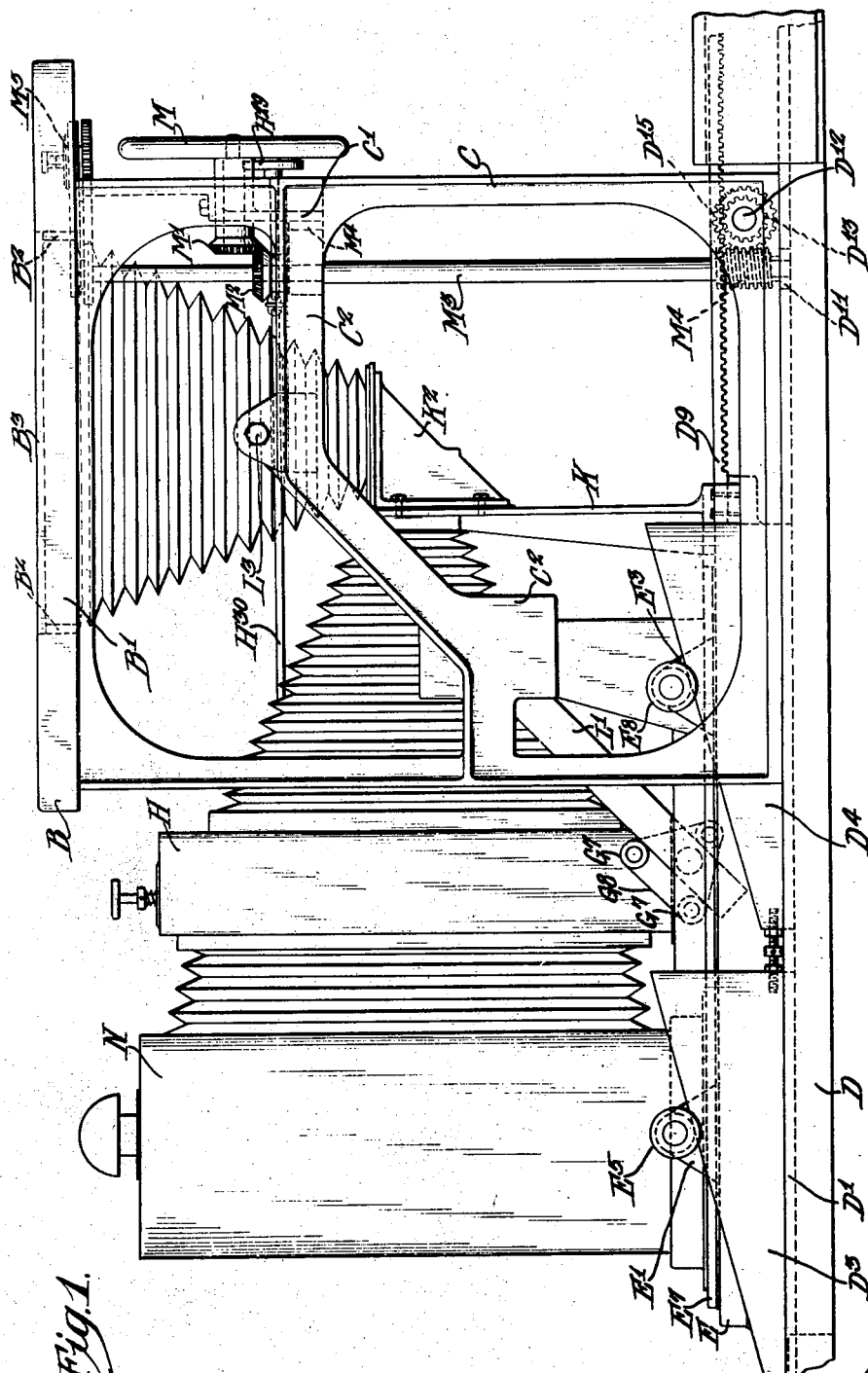

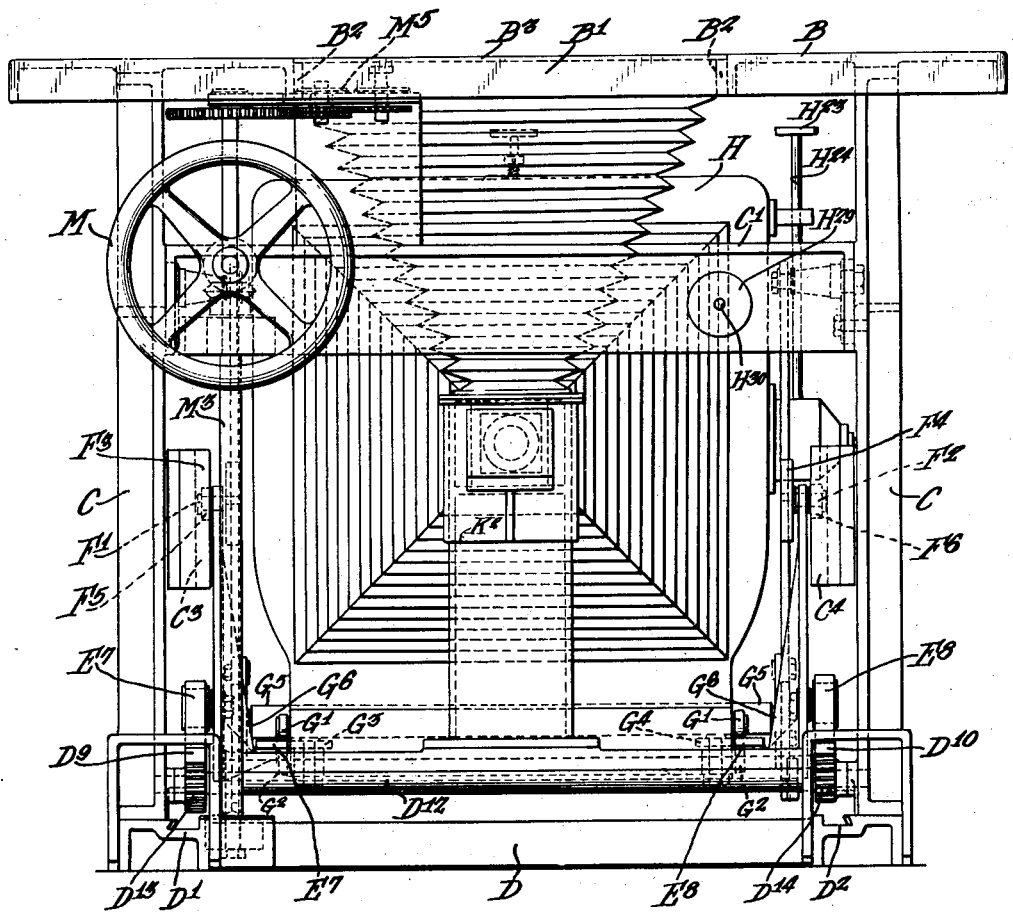

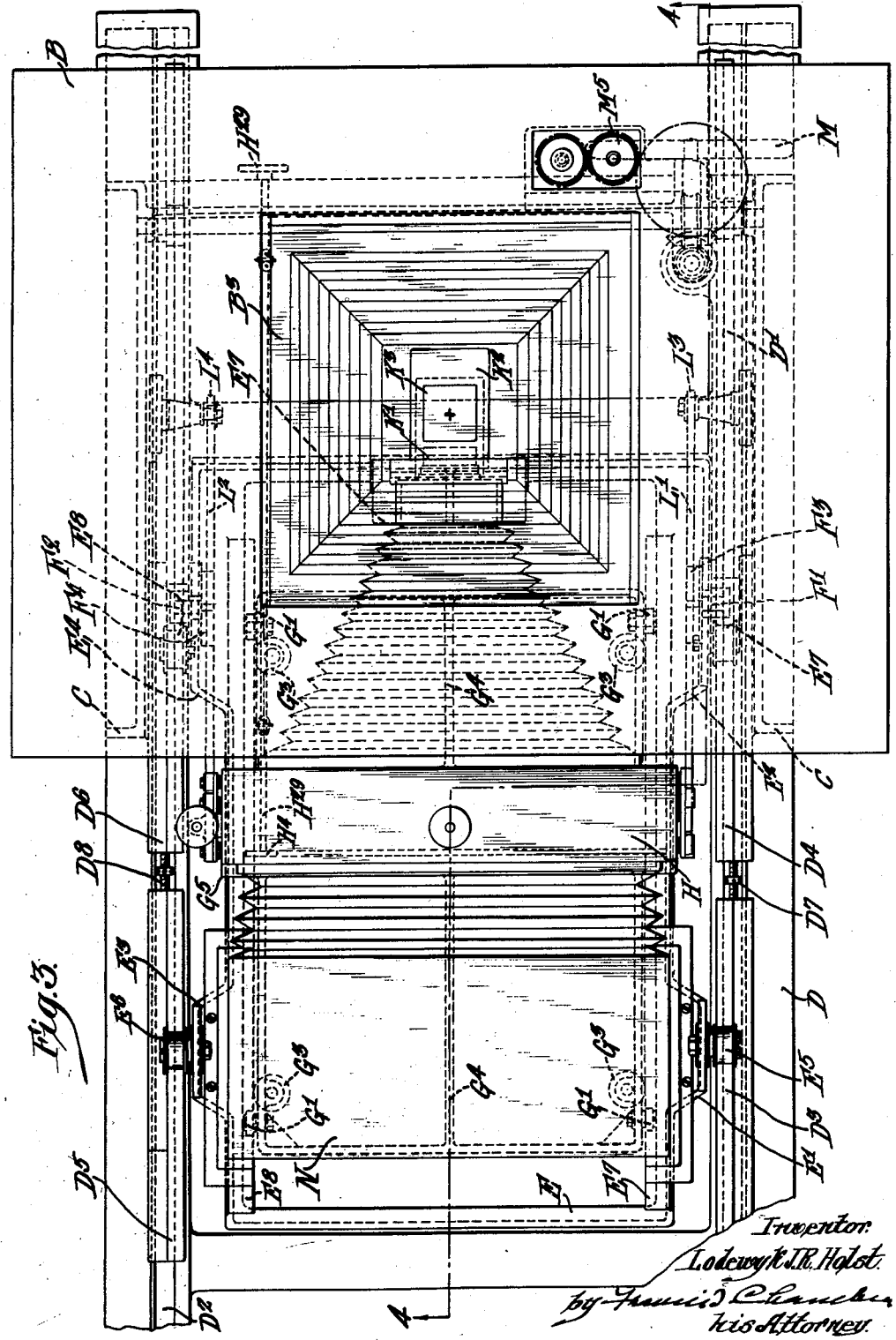

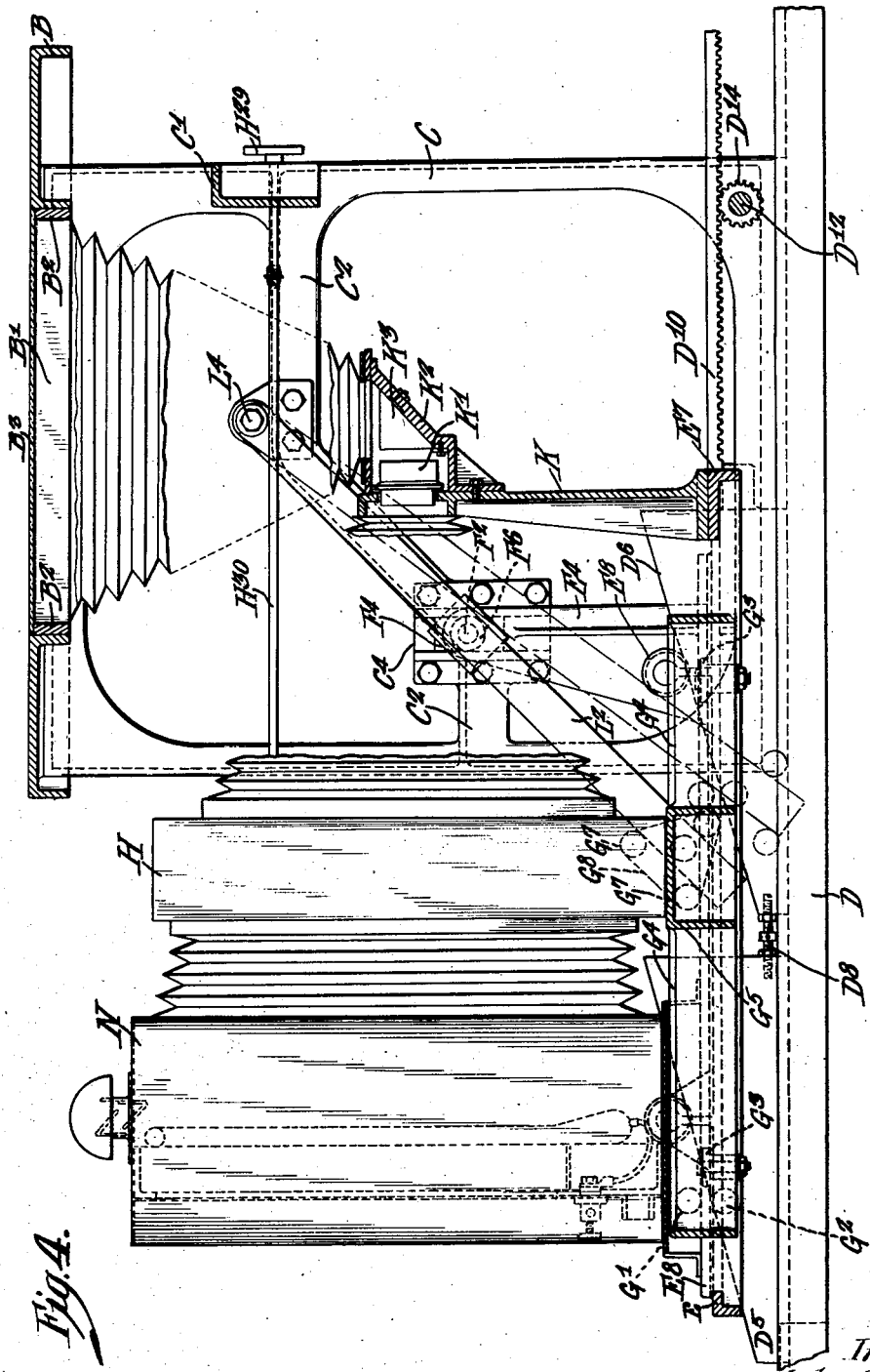

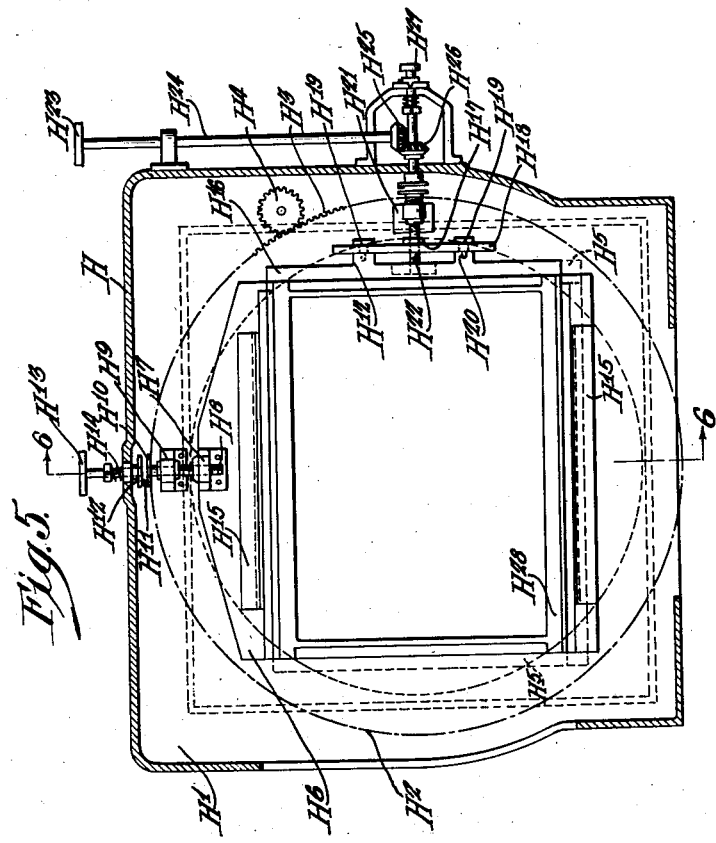
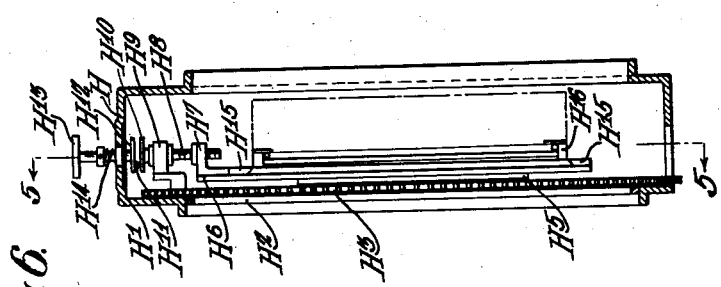

1,633,253

UNITED STATES PATENT OFFICE.

LODEWYK J. R. HOLST, OF BROOKLINE, PENNSYLVANIA, ASSIGNOR TO BROCK & WEYMOUTH, INCORPORATED, OF PHILADELPHIA, PENNSYLVANIA, A CORPORATION OF DELAWARE.

PROJECTION TRACING TABLE.

Application filed June 23, 1925, Serial No. 39,002. Renewed December 9, 1923.

My invention relates to a projection tracing table for use in preparing maps from aerial photographic views.

Norman H. Brock in Patent No. 1,612,800 dated Jan. 4, 1927 has described a new method of projecting on a previously prepared traverse, a series of photographic views having the contour lines drawn on them, the various contour lines of the photographs being each successively projected, corrected to the scale of the traverse and then traced thereon. The object of my invention is to provide an apparatus suitable for the practice of this method and including an automatic focusing projector especially well adapted for this use.

Generally speaking, my invention consists in providing a glass tracing table on which the traverse made on tracing cloth is adjusted and combining therewith a projecting camera having a reflector by means of which the image is projected upward through the glass to a focal plane coincident with the top surface of the glass, and having also automatic focusing means whereby this focal plane is maintained for all scale adjustments of the projector.

For the better understanding of the manner in which this is accomplished I will describe my invention with the aid of the annexed drawings, in which:

Figure 1 is a side elevation of my new apparatus.

Figure 2 is a front view thereof.

Figure 3 is a plan view.

Figure 4 is a vertical longitudinal section on the line 4—4 of Fig. 3 showing the camera box and the lamp thereon in side elevation.

Figure 5 is an elevational section through the camera box on line 5—5 of Fig. 6.

Figure 6 is a vertical section through the camera box on line 6—6 of Fig. 5.

In these drawings the same letters and numerals refer each time to the same part. The letter B and its subnumerals denote the table top and elements connected thereto. C, $C^1$ to $C^5$ indicate the side frames, while D to $D^{10}$ refer to the base plate and various elements adjacent thereto. The elements forming the vertical guide for the lens-carriage are indicated by F to $F^6$, whereas this carriage is described with the help of the letters E to $E^6$. The plate carriage and its appurtenances are denoted by G to $G^6$, whereas the camera, and the various elements to support and adjust the photographic plate are described with the help of the letters H to $H^{24}$. The lens-standard and the elements carried by it are marked K to $K^3$, the focusing lever L and $L^1$, and finally the elements of the mechanism for operating the instrument are denoted by M to $M^4$, while the lamp housing is denoted by N.

Referring first to Figure 1, B is the table top, in which an opening $B^1$ is fitted with strips $B^2$ to support flush with the top surface a glass plate $B^3$. The tracing upon which the photographs are to be traced rests on the glass plate $B^3$, and consequently the projector is adjusted so as to always produce a sharp image on the top surface of the glass plate $B^3$.

Two side frames C, shown in Figs. 1, 2, 3 and 4, support the table B at a suitable height above the base plate D. A transverse brace $C^1$ bolted between the two frames C, helps to increase the sideways rigidity of the instrument, besides serving other purposes later to be explained. Each one of the side frames C is furthermore strengthened by a brace $C^2$ which connects the front and rear upright members of the frame casting C and forms an integral part thereof. They also perform other functions which will be fully described.

The two longitudinal members of the base plate D are machined over their entire length, to receive the side frames C, and to furnish dove-tailed guide ways $D^1$ and $D^2$, in each one of which two similar wedge-shaped blocks $D^3$—$D^4$ and $D^5$—$D^6$ are slidably adjustable. Right and left hand screw bolts $D^7$ and $D^8$, lock the wedges $D^3$ and $D^4$ and $D^5$ and $D^6$ respectively together and permit to regulate their distances accurately for purpose later to be fully explained. The high end-surfaces of the wedge blocks $D^4$ and $D^6$ carry integrally formed lugs to which tooth-racks $D^9$ and $D^{10}$ are bolted, the teeth being on the under surfaces of these racks. They are of adequate length to give by means of the operating mechanism still to be described, the required sliding movement to the two pairs of wedge blocks in the dove tailed grooves $D^1$ and $D^2$. The purpose of these wedge blocks is to support and adjust the position of the lens-carriage E which is provided with four outwardly and upwardly extending lugs $E^1$, $E^2$, $E^3$ and $E^4$. The lugs $E^1$ and $E^3$ project only high enough to support flanged rollers $E^5$ and $E^6$, their flanges straddling the wedge blocks $D^3$ and $D^5$ respectively. The lugs $E^2$ and $E^4$ support similar rollers $E^7$ and $E^8$, straddling the wedge-blocks $D^4$ and $D^6$ respectively. The pivots of the two latter rollers are placed equally high above the top surface of the lens-carriage E as the pivots of the rollers $E^5$ and $E^6$, so that when the wedges are spaced at the same distance separating the rollers-pairs $E^5$—$E^7$ and $E^6$—$E^8$, the lens carriage E will be supported on a plane parallel to that of the top surface of the base plate D throughout the range of adjustment of the wedges.

The lugs $E^2$ and $E^4$ are higher than the lugs $E^1$ and $E^3$, for the purpose of carrying pivots $F^1$ and $F^2$ on their inner sides. These pivots carry guide sleeves $F^3$ and $F^4$ and on the outer side guide rollers $F^5$ and $F^6$, which rollers engage vertical guide grooves $C^3$ and $C^4$, formed in frame-braces $C^2$.

The load of the mechanism supported by the lens-carriage E insures the continuous contact of its supporting rollers with their respective wedge blocks, and since the guide rollers $F^5$ and $F^6$ can only move in a direction at right angles to the motion of the wedges, the result will be that sliding movements of the latter will cause up or down movements of the lens carriage, dependent upon the direction in which the four wedge blocks are displaced.

Fig. 3 plainly illustrates that the lens carriage E is formed by a rectangular frame casting consisting mainly of four ribs of angle-iron like cross section as shown in Fig. 4. The longitudinal ribs are machine finished on their upper faces so as to permit securing thereto the hardened steel guide strips $E^7$ and $E^8$, to form a set of parallel guide ways upon which the plate carriage G is mounted by means of four rollers $G^1$, placed near the four corners of the plate carrier. A second set of four rollers $G^2$, contacts with the inwardly overhanging bottom surfaces of the guide strips $E^7$ and $E^8$ to prevent the possibility of the plate carriage losing contact with the upper face of the lens-carriage.

The plate carriage is sufficiently shorter than the inside length of the lens carriage to allow for a certain amount of back and forth movement over the latter. A third set of four rollers $G^3$, pivoting on vertical pivots supported in the plate carriage casting, contact with the two parallel inner surfaces of the guide strips $E^7$ and $E^8$ and serve to maintain during the movement of the plate carriage over the lens carriage the proper relative alignment of these two carriages.

Longitudinal central ribs $G^4$ connect the two end ribs of the plate carriage with its transverse box-rib $G^5$. This rib has an upper surface of adequate width to support the camera box H. This upper surface projects a little above the upper surface of the main body of the plate carriage and its longitudinal ribs, and is accurately machined to be parallel with the upper face of the lens carriage. In width the box-rib $G^5$ extends on either side symmetrically beyond the width of the main body of the plate carriage G, and the two ends are closed by machine finished surfaces $G^6$, at right angles to the upper face $G^5$ and parallel to the longitudinal axes of the casting G.

The front transverse member of the lens carriage E is provided with a centrally located platform $E^7$, which supports the lens standard K, to which the lens $K^1$ and prism box $K^2$ supporting a prism $K^3$ are all rigidly attached. The lens carriage E and the plate carriage G are operatively connected by a pair of single armed focusing levers $L^1$ and $L^2$ which are hardened and ground to insure perfect flatness and parallelism of their surfaces. Each of these levers is pivoted on a bracket $C^5$ bolted to the braces $C^2$ in the main side frames C, as plainly shown in Fig. 1. These levers respectively engage the sleeves $F^3$ and $F^4$ which are pivoted on the front lugs $E^1$ and $E^4$ of the lens carriage E. The up and downward motion of this carriage due to sliding movements of the wedge blocks $D^3$, $D^4$ and $D^5$, $D^6$, will consequently cause the levers L to rock around their pivots, with a simultaneous rocking motion of the sleeves $F^3$ and $F^4$, through which they will slide, and the cooperative action of these various elements will cause the center line of the lever arms to always pass through the center of the pivots around which the sleeves $F^3$ and $F^4$ can rock back and forth.

Near their lower ends, the levers $L^1$ and $L^2$ pass each through a set of three rollers $G^7$ rotatably mounted on plates $G^8$ which themselves are pivoted at $G^9$ in the closed end-surfaces $G^6$ of the box-rib $G^5$ on the plate carriage G. Two of the rollers $G^7$ engage the upper edge of the levers $L^1$ and $L^2$ while the third one engages their lower edges. It will thus be seen that the pivoted plates $G^8$ and the rollers $G^7$ are mechanical equivalents of the sleeves $F^3$ and $F^4$, the roller construction having been applied in this instance for the purpose of minimizing frictional resistance against the back and forth motion of the plate-carriage over the lens carriage, a movement which by the described arrangement of necessity accompanies any up or down movement of the lens carriage and is illustrated by the dotted position $L^1$ of lever $L^2$ in Fig. 4.

If now the mechanism be so adjusted that when the levers $L^1$ and $L^2$ make angles of 45 degrees with the plane of the lens and plate carriage the pivot-centers of the sleeves $F^3$ and $F^4$ are at a distance equal to the focal length of the lens $K^1$ from the vertical and horizontal lines which can be drawn through the axis of the pivots $L^3$ and $L^4$, Fig. 4, and at the same time the back and front focal distances from this lens to the focal plane of the camera H and to the upper surface of the glass plate $B^3$ are made to be twice this focal length, the various elements thus far described will be in their correct relative positions. If then by operating the wedge blocks $D^3$, $D^4$ and $D^5$ $D^6$ the lens carriage is lifted or lowered to change the front focal distance, the levers $L^1$ and $L^2$ will cause the plate carriage G to move back or forth by the correct amount to maintain on the stationary upper surface of glass plate $B^3$, in all adjustments of the lens carriage, a sharp image of the plate held in the camera H.

The adjustment of the wedge blocks $D^3$, $D^4$, $D^5$, $D^6$ is accomplished by means of the mechanism now to be described. Within easy reach of the draftsman's left hand, the hand wheel M, Figs. 1–2–3, is mounted on a shaft which has its bearing in the cross brace $C^1$. The rear end of this shaft carries a bevel gear $M^1$, which meshes with the bevel gear $M^2$ keyed to the vertical shaft $M^3$ which has a bearing in the bracket $M^4$ bolted to the crossbrace $C^1$ (Fig. 1).

At its lower end the vertical shaft $M^3$ has a bearing in the lug $D^{11}$ formed for this purpose on the base plate D.

A transverse shaft $D^{12}$, carrying pinions $D^{13}$ and $D^{14}$, is pivoted in bushings formed in the side frames C. These pinions engage the racks $D^9$ and $D^{10}$ attached to the two forward wedge blocks.

Furthermore the worm-screw $M^4$, engages a wormwheel $D^{15}$ which is keyed to the transverse shaft $D^{12}$, and consequently the rotation of the hand wheel M is transmitted by the bevel gears $M^1$ and $M^2$ to the shaft $M^3$, hence by the worm-screw $M^4$ to the wormwheel $D^{15}$, and finally the transverse shaft $D^{12}$ and the spur-pinions $D^{13}$ and $D^{14}$ to the tooth racks $D^9$ and $D^{10}$.

Figs. 5 and 6 illustrate details of the camera construction and the devices provided for the centering of the view in its proper positioning on the screen $E^3$.

The front of the camera body H is formed by a plate $H^1$ which has a circular center opening to serve as pivot for the turntable $H^2$. The outer rim of this turntable is provided with spur teeth $H^3$ co-operating with a spur pinion $H^4$ carried on a spindle having its bearing in the housing H. The turntable has a rectangular opening. Along the two sides thereof guide strips $H^5$ are placed so as to permit the vertical slide $H^6$ to move up and down between them. This adjustment is accomplished by means of the screw $H^8$ which has a thrust bearing in the block $H^9$ which is fastened to the turntable $H^2$. The upper end of the screwshaft $H^8$ terminates in the clutch disk $H^{10}$. The holes in the disk are adapted to engage a pin $H^{11}$ projecting downward from the second clutch $H^{12}$, which latter is attached to the operating knob $H^{13}$. A spring $H^{14}$ tends to keep the pin $H^{11}$ free from the lower clutch plate $H^{10}$. Depression of the knob $H^{13}$, with simultaneous rotation will cause engagement of the pin $H^{11}$ with one of the holes in the disk $H^{10}$, thereby also causing the screw to rotate in the nut $H^7$, which will result in the raising or lowering of this nut and of the vertical slide $H^6$ to which the latter is attached.

The vertical slide $H^6$ is further provided with a pair of horizontal guide strips $H^{15}$ adapted to guide the horizontal slide $H^{16}$. The nut $H^{17}$ is formed in a bar $H^{18}$, having slots through which screws $H^{19}$ reach into lugs $H^{20}$ projecting from the slide $H^{16}$. The thrust-bearing $H^{21}$ is fastened to the turntable $H^2$ and a screwshaft $H^{22}$ cooperating with the nut $H^{17}$ serves to produce the horizontal displacement of the slide $H^{16}$, the slots in the bar $H^{18}$ permitting to give any required vertical adjustment to the horizontal slide without affecting its horizontal adjustments. The clutch arrangement for the drive of the screw $H^{22}$ is entirely similar to that described in connection with the screw $H^8$, but in order to bring the operating knob $H^{23}$ for the horizontal adjustment in a convenient position the clutch shaft $H^{27}$ is operated by means of a vertical shaft $H^{24}$, and a pair of mitre-gears $H^{25}$ and $H^{26}$.

The combined operation of the vertical slide $H^6$, the horizontal slide $H^{16}$ and the turntable $H^2$ permits to adjust the plate holder $H^{28}$, so that any required point of the view placed in the holder can be brought in coincidence with the lens axis of the projector and so that any other point of such view can be placed in the horizontal or vertical centerline of the projector. To accomplish this the horizontal and vertical slides are operated until the required point appears in coincidence with the lens axis, the position of which is made visible by a cross etched in the corresponding point of the glass plate $B^3$. This having been done, the clutches in both screws are uncoupled, whereupon the turntable can be rotated by means of the knob H²⁹, having its bearing in the cross-brace $c^1$ and the telescoping-universal coupled shaft H³⁰.

The vertical shaft M³ extends upwardly beyond the bevel gear M² to operate an indicator mechanism M⁶ (Figs. 1, 2 and 3) to regulate the exact position of the lens as required for varying degrees of magnification.

Having now described my invention what I claim as new and desire to secure by Letters Patent is:

1. A scale adjusting projector and tracing table for photographic views comprising a substantially horizontal transparent support for a tracing, coincident with the anterior focal plane of said projector, a lens having its axis substantially horizontal and below said transparent support, a substantially vertical horizontally movable plate holder adapted to hold the photographic views in the posterior focal plane of the projector, and a reflector adapted to reflect the view upward, in combination with automatic focusing means whereby the anterior focal plane is maintained in the top surface of said horizontal transparent support for all scale adjustments of said projector.

2. In a projector according to claim 1, an automatic focusing system comprising a single armed lever, adapted to swivel around a pivot having a fixed relation to one of the focal planes, a lens-carrier, means to guide said lens-carrier vertically, means to adjust said lens-carrier upwardly and downwardly along said vertical guideways, a plate carriage supported by and movable along said lens-carrier in a direction parallel to the lens axis, operative connections between said lens-carrier and said single armed lever whereby the latter is swivelled during vertical adjustments of the lens-carrier, and operative connections between said single armed lever and said plate carriage whereby during adjustments of the lens-carrier, the plate carriage is displaced over the lens-carrier by the amount of the horizontal component of the corresponding swivel movement of said single armed lever.

LODEWYK J. R. HOLST.